H. C. HAZLEWOOD.
HEN'S NEST.
APPLICATION FILED APR. 18, 1912.
1,121,498.
Patented Dec. 15, 1914.
3 SHEETS—SHEET 1.
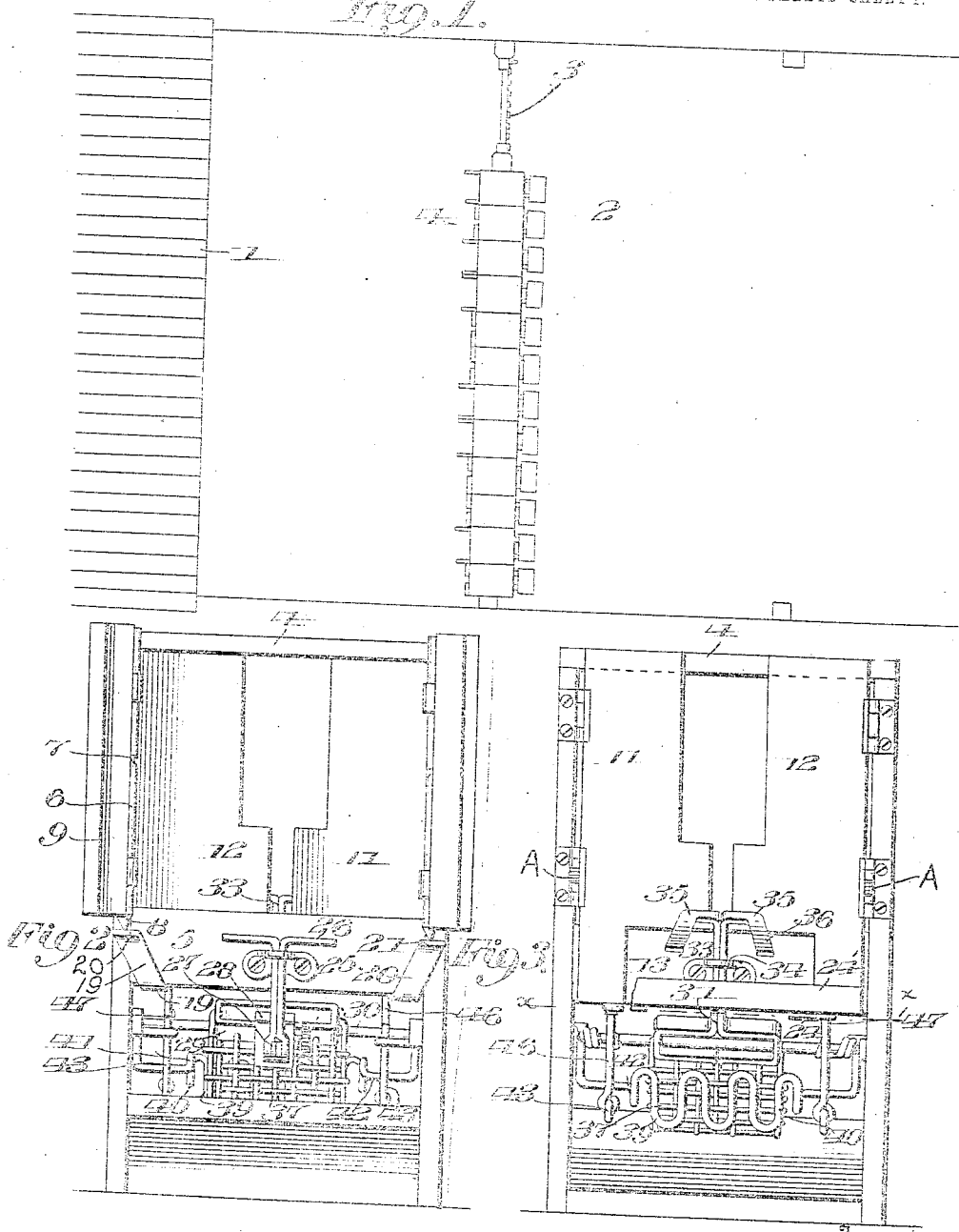
Witnesses
Inventor
Horace C. Hazlewood
By Victor J. Evans
Attorney H. C. HAZLEWOOD.
HEN'S NEST.
APPLICATION FILED APR. 18, 1913.
1,121,498.
Patented Dec. 15, 1914.
3 SHEETS—SHEET 2.
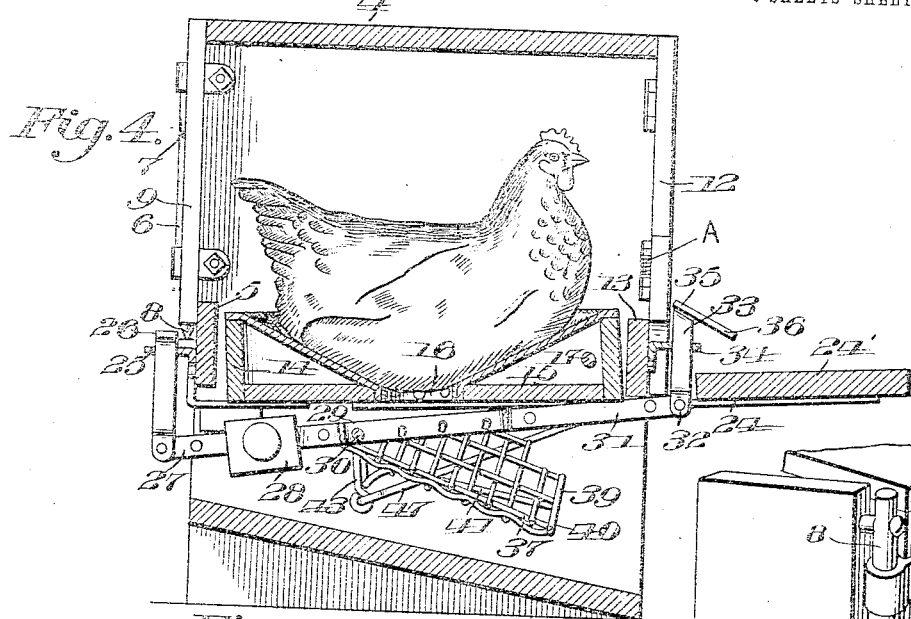
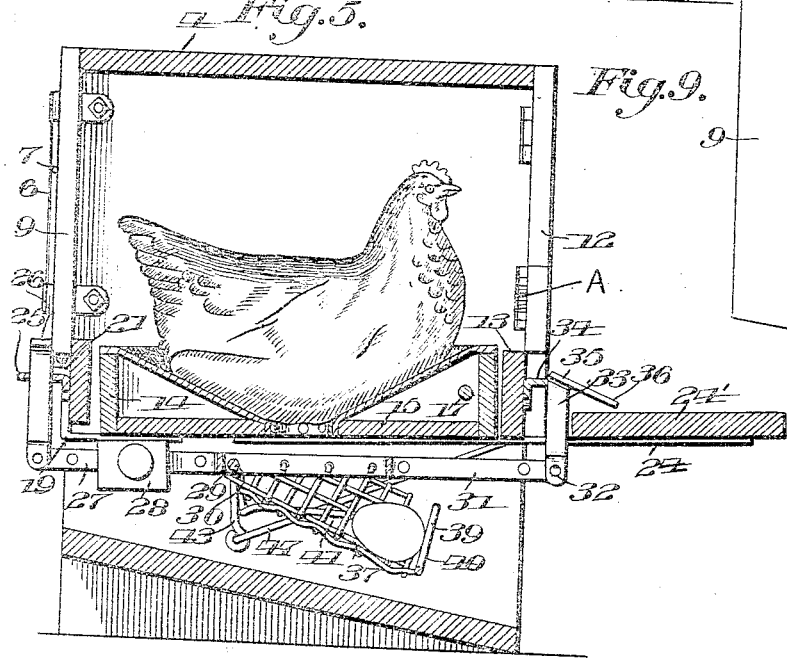
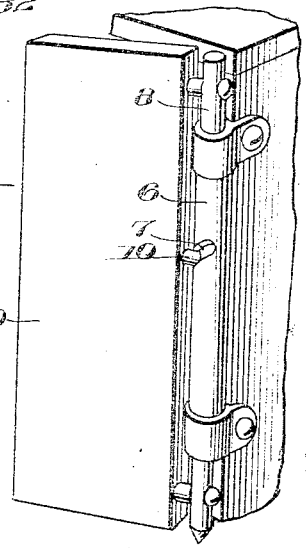
Witnesses
Inventor
Horace C. Hazlewood
By Victor J. Evans
Attorney

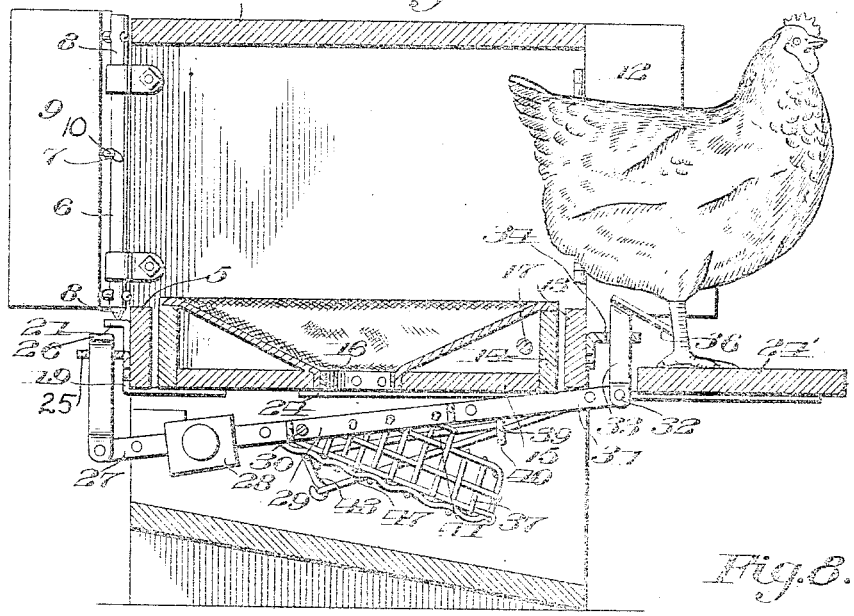

UNITED STATES PATENT OFFICE.

HORACE C. HAZLEWOOD, OF BISBEE, ARIZONA, ASSIGNOR OF ONE-HALF TO JESSE L. KING, OF BISBEE, ARIZONA.

HEN'S NEST.

1,121,498.    Specification of Letters Patent.    Patented Dec. 15, 1914.

Application filed April 18, 1913. Serial No. 762,002.

*To all whom it may concern:*

Be it known that I, HORACE C. HAZLEWOOD, a citizen of the United States, residing at Bisbee, in the county of Cochise and State of Arizona, have invented new and useful Improvements in Hens' Nests, of which the following is a specification.

The present invention relates to nests for hens.

In carrying out the invention it is my purpose to provide a hen's nest which is arranged between the hennery and the poultry run, the nest forming the entrance to the run and being so constructed as to permit of the hen entering the nest but preventing her from passing to within the run until after an egg has been deposited within the nest, and thus providing means whereby the poultryman can readily distinguish the laying hens from the non-layers.

Another object of the invention is the provision of a nest which forms an entrance between a hennery and a run, that shall be provided with oppositely arranged doors, one at the entrance to the nest and the other at the exit from the nest, the entrance door being normally open, but which will close automatically when the hen enters the nest, the said door, however, remaining unlatched so as to permit the hen reëntering the hennery when she does not desire to lay an egg, the closed door also preventing the entrance of more than one hen to the nest; the exit door being normally retained in a locked position until after the hen has deposited an egg within the nest, when the said door will become unlatched to permit of the hen passing from the nest to the run; the weight of the hen upon a platform arranged adjacent the exit door actuating mechanism which will automatically open the entrance door and lock the outlet door.

With the above recited objects in view, and others which will appear as the description of the invention progresses, the improvement resides in the construction, combination and arrangement of parts set forth in the following specification, and falling within the scope of the appended claims.

In the drawings, Figure 1 is a view illustrating the arrangement of a plurality of trap nests between the hennery and a runway. Fig. 2 is an end view of the trap showing the position of the entrance doors before the hen enters the nest. Fig. 3 is a similar view but looking toward the opposite end of the nest. Fig. 4 is a longitudinal sectional view illustrating the arrangement of parts when the hen is seated upon the nest. Fig. 5 is a similar view showing the arrangement of the parts after the hen has deposited an egg. Fig. 6 is a similar sectional view illustrating the manner in which the entrance doors are opened when the hen passes out of the nest. Fig. 7 is a horizontal sectional view taken approximately on the line $x$—$x$ of Fig. 3. Fig. 8 is a central vertical transverse sectional view through the nest. Fig. 9 is a detail view illustrating the manner of hingedly connecting one of the entrance doors to the nest.

Referring now to the drawings in detail, the numeral 1 designates the hennery of a poultry yard, and 2 the poultry run which is divided from the hennery through the medium of a fence 3. Secured upon the fence 3 and forming a passage between the hennery and the runway are a plurality of trap nests 4. Any number of these may be employed, but as all of the said nests are of a similar construction only one of the same will be described in detail.

Each of the nests 4 comprises a substantially rectangular housing having open ends and preferably having its lower floor inclined. The open end which forms the entrance to the nest and which is arranged adjacent the hennery is partially closed through the medium of a transversely arranged strip 5. The sides of this end are provided with sleeves 6, the same being secured to the sides of the nest in any desired or preferred manner, and each of the said sleeves is, approximately centrally, provided with an outwardly inclined slot 7. Arranged within each of the sleeves and extending both above and below the same is a rod member 8, each of which provides a pintle for a door 9. Connected one with each of the rods 8 and with each of the doors 9, and extending through the inclined slot 7, is a pin 10, the same riding upon the lower wall provided by the slot 7 in the sleeve 6. Each of the doors 9 is of sufficient weight to cause this pin 10 to revolve the rod 8 to rotate each of the doors to a closed position. The two doors 9 are not of a sufficient width to entirely close the entrance to the nest, the adjacent edges of the doors terminating a suitable distance away from the center of the nest. This is desirable in order to permit of the proper ventilation of the nest, as well as to permit a light opening, whereby a hen not depositing an egg within the nest may return to the hennery.

The opposite or outlet end of the nest is also provided with a pair of hinged doors 11 and 12, the said doors, or the hinges of the doors being provided with suitable springs A for normally retaining the doors in a closed position. These doors also do not fully close the end of the nest to which they are attached, the adjacent edges of the doors at the upper portions thereof being formed with rectangular depressions rendering the space between the doors sufficient to permit the hen passing her head therethrough. It may here be stated that the springs of the hinges are comparatively weak, so that the doors will yield to a slight amount of inward pressure thereon. The end provided with the doors 11 and 12 is also partially closed through the medium of a strip 13, the same being arranged in a plane approximately parallel to the connecting member 5 of the entrance end of the nest.

Arranged within the receptacle is a substantially rectangular nest frame 14, the same being provided with a bottom portion 15 which has a central opening 16. The frame has its upper portion arranged approximately in a plane with the connecting or dividing members 5 and 13, and the top of the frame is provided with a coating of soft material, such as burlap, which is connected to the upper edges of the frame, and slopes downwardly to the central opening in the frame. The nest frame is pivoted between the sides of the housing through the medium of a longitudinally extending rod 17 which passes through openings in the side of the nest which are arranged adjacent the connecting member 13. It will be thus noted that the frame is pivoted eccentrically of the housing, and the inner weighted end of the said frame has attached thereto angular bracket members 19 and 20 which have their outer arms arranged adjacent the outer face of the connecting member 5, and which have their upper extremities flanged outwardly as at 21 to provide lips which are arranged directly below the lower ends of the pintles 8 on the doors 9. The downward swinging of the weighted end of the nest is limited by suitable stops S secured to the sides of the housing. The nest frame is also provided with bars 23 and 24 which extend below the connecting member 13 of the nest and have their portions extending beyond the nest connected with a platform 24′. It will be noted that when pressure is exerted upon the platform 24′ the members 19 and 20 will be swung upwardly so that their lips 21 engaging with the lower pointed ends of the rods 8, will raise the said rods causing the pins 10 of the doors 9 to travel upwardly within the inclined slots 7, and thus swing the said doors to an open position.

Mounted within a suitable bearing 25 which is arranged centrally of the member 5 of the housing is a latch 26. This latch 26 comprises a substantially T-shaped member, the upper arms of which being normally sustained below the lower edges of the doors 9, but which, when the said latch is moved upwardly will lie within the path of contact of the said doors and thus prevent the opening of the doors. Pivotally connected with the lower portion of the latch 26 is a longitudinally extending arm 27, the same being provided with an adjustable weight 28 and this arm is connected with a substantially rectangular yoke 29 which is pivotally connected between the sides of the nest through the medium of a shaft 30. The rectangular yoke 29 is provided with a rod extension 31, the said extension being pivotally connected as at 32 with a vertical arm 33 of a latch member for the doors 11 and 12 of the nest. This latch member is mounted in a suitable bearing 34 and has its upper portion provided with oppositely disposed arms 35, the extremities of which are bent downwardly and outwardly as at 26. This latch is adapted to be normally sustained above the lower edges of the doors 11 and 12 through the medium of the weight 28, to prevent the opening of said doors. The rectangular yoke 29 is arranged centrally of and below the opening of the nest frame, and has connected thereto a reticulated downwardly inclined basket 37 which has its outer end open.

The open end of the basket is normally closed through the medium of a gravity gate 40. The gate proper is bent to provide a serpentine or a plurality of substantially U-shaped connected members 39, the said portion 39 being arranged at the open end or mouth of the basket, and the said gate is provided with rearwardly extending side arms 41 which are arranged to the opposite sides of the basket, the said arms, adjacent their ends being extended outwardly, that is, being bent each toward one of the sides of the housing to provide what I will term contact portions 42, said portions being disposed below and in a plane with that of the shaft 30. The ends of these portions 42 are bent upwardly and have their extremities loosely coiled around the shaft 30. Also loosely arranged upon the shaft 30 is one of the ends of two link members 43, the said links being disposed in the path of contact with the portions 42 of the arms of the basket, and the ends of said links being loosely connected thereto one of the ends of longitudinally extending rods 46 and 47, opposite ends of said rods being secured each to one of the doors 11 and 12 respectively.

From the above described arrangement of parts it will be noted that the egg is adapted to drop through the central opening of the nest frame to within the reticulated basket. The weight of the egg is sufficient to tilt the yoke 29 and the latches connected with the arms associated therewith to which the latches are attached, so as to cause the latch 26 to lock the doors 9 and to slide the second latch out of the path of contact with the doors 11 and 12 to permit of the free opening of the said doors 11 and 12. When the hen forces the doors 11 and 12 open, against the tension of their spring hinges, the arms 46 and 47 connected thereto will swing the links 43 to cause the same to contact with the portion 42 of the side arms of the gate, to swing the said gate upwardly above the open mouth of the basket and allow the egg to slide from the basket to a suitable receptacle provided upon the lower inclined floor of the nest. When the hen steps upon the platform 24 the nest frame will be swung about its pivot 17 and cause the lips of the members 19 and 20 to engage with the pintles of the doors 9 to swing the same to an open position as has previously been described. When the hen passes the doors 11 and 12, the spring hinges of the said doors will swing the same to a closed position, the inclined ends of the catch for the doors permitting of the lower ends of the doors passing the said catch, while the weight 28 will swing the latch 19 into locked position, and the latch of the doors 9 out of engagement with the same.

Having thus described the invention, what I claim is:—

1. In a device for the purpose set forth, a housing having open ends, doors for partially closing the ends, spring means for retaining one of the doors closed, a hinge for the second door, said hinge including a sleeve which is connected with the housing and which is provided with an angular slot, a rod within the sleeve and extending below the same, a pin secured to the rod and passing through the slot and connected with the door, a nest frame pivotally secured within the housing, a bracket upon the nest frame underlying the projecting end of the hinge rod, a platform arranged adjacent the exterior of the housing and connected with the nest frame, and adapted, when a weight is placed upon the said platform, to tilt the frame, to bring the bracket into contact with the projecting end of the hinged rod to force the same within the sleeve and to cause the pin to travel within the inclined slot of the sleeve to actuate the door.

2. In a device for the purpose set forth, a housing having open ends, doors for partially closing each of the open ends, spring means upon one of the doors for retaining the same in a closed position, a hinge for the second door including a sleeve having an inclined slot, a rod loosely positioned within the sleeve and having one end projecting through the sleeve, a connection between the rod and the door, a pin connected with the door and passing through the slot and secured to the rod, a nest frame within the housing and pivoted adjacent the spring door thereof, a bracket connected with the nest frame and having a lip portion which underlies the projecting end of the rod, a platform arranged adjacent the exterior of the housing and connected with the nest frame and adapted when a weight is arranged upon the said platform to bring the lip of the bracket into engagement with the rod to move the same within the sleeve to cause the pin connection between the sleeve and the rod to travel within the inclined slot of the sleeve to actuate the door, latch members for the doors, a weighted connection between said latch members to retain one of the latch members in locked position with relation to one of the doors and the second latch member out of locking position with relation to the second door, and means for actuating the weighted connection thereby reversing the arrangement of the latches.

3. In a device for the purpose set forth, a rectangular housing having open ends, doors for the ends, spring means for normally closing one of the doors, a nest frame within the housing and pivotally secured to the sides thereof adjacent the spring closed door, a platform connected with the nest frame and arranged beyond the end of the housing provided with the spring pressed door, means including mechanism arranged between the nest frame and the second mentioned door for opening the said door when a pressure is exerted upon the platform, a nest within the nest frame, said nest and frame having each a central opening, a transverse shaft connected with the sides of the housing below the nest frame and adjacent the opening thereof, a yoke member upon the shaft and provided with an inclined basket which has an open end, rod extensions for the yoke, a weight upon one of the said extensions, latch members connected with the ends of the rods and disposed adjacent the doors and adapted to coöperate with the said doors to normally retain the spring actuated door in a locked position, and the second door in an unlocked position, the latch for the spring pressed door having a downwardly and outwardly inclined upper face whereby the said spring door may tilt the latch when closed by its spring, a gate for closing the open mouth of the basket, said gate having side arms provided with offset contact portions and ends hingedly connected with the shaft, depending links loosely connected with the shaft and arranged within the path of contact of the contact portions of the arms of the gate, and rod connections between the links and the spring pressed door.

4. In a hen's nest of the class and for the purpose set forth, a box having openings providing an entrance and an exit, a sleeve having a downwardly inclined slot connected with the entrance to the box, a pintle passing through the sleeve, a door connected with the pintle, a pin connected with the pintle and door and passing through the inclined slot in the sleeve, normally closed doors for the exit, a nest frame having an opening arranged within the box and pivotally connected thereto adjacent the outlet thereof, bracket members connected thereto adjacent the outlet thereof, bracket members connected with the frame, and arranged to contact with the pintles of the entrance door, a basket having an open end pivotally secured below the opening of the nest frame, longitudinally extending arms connected with the basket, vertically arranged latch members connected with the arms and disposed for engagement with the doors, a weight on one of the arms to swing the arms and basket to bring one of the latches into engagement with the entrance door, the frame adapted when a weight is arranged upon the same to tilt and bring its brackets out of engagement with the pintles to permit the entrance door closing by gravity, a member normally closing the open side of the basket, a connection between this member and the outlet door adapted to bring the same away from a basket when the said outlet door is swung to an open position, and means comprising an independent weight adapted to be arranged within the basket to tilt the said basket and arms to bring one of the latches out of engagement with the normally locked door, and the second latch into engagement with the normally unlocked door, and means connected with the frame for returning all of the parts to their initial positions.

In testimony whereof I affix my signature in presence of two witnesses.

HORACE C. HAZLEWOOD.

Witnesses:
 BRUCE PERLEY,
 I. W. WALLACE.